United States Patent
Sorimachi et al.

(10) Patent No.: US 8,178,786 B2
(45) Date of Patent: May 15, 2012

(54) RADIATION-PROOF SHEATH MATERIAL AND RADIATION-PROOF CABLE

(75) Inventors: Masami Sorimachi, Hitachi (JP); Yoshiaki Nakamura, Hitachi (JP); Hitoshi Kimura, Hitachi (JP); Shigeki Matsuyama, Mito (JP)

(73) Assignee: Hitachi Cable, Ltd., Tokyo (JP)

( * ) Notice: Subject to any disclaimer, the term of this patent is extended or adjusted under 35 U.S.C. 154(b) by 209 days.

(21) Appl. No.: 12/432,934

(22) Filed: Apr. 30, 2009

(65) Prior Publication Data

US 2010/0084181 A1    Apr. 8, 2010

(30) Foreign Application Priority Data

May 1, 2008   (JP) ................................. 2008-119655

(51) Int. Cl.
*H01B 7/00* (2006.01)
(52) U.S. Cl. .............................. 174/110 R; 174/110 PM
(58) Field of Classification Search .............. 174/110 R, 174/113 R, 120 R, 121 A, 121 AR, 120 AR, 174/110 FC, 110 SR
See application file for complete search history.

(56) References Cited

U.S. PATENT DOCUMENTS

| | | | | |
|---|---|---|---|---|
| 3,546,014 A * | 12/1970 | Nicodemus | ................... | 427/118 |
| 3,860,676 A * | 1/1975 | Krackeler et al. | ............. | 524/111 |
| 4,096,346 A * | 6/1978 | Stine et al. | ...................... | 174/36 |
| 4,900,766 A * | 2/1990 | Kubo et al. | ..................... | 523/136 |
| 2005/0023024 A1* | 2/2005 | Nakatsukasa et al. | ....... | 174/68.1 |
| 2007/0254980 A1* | 11/2007 | Nakatsukasa et al. | ......... | 523/136 |

FOREIGN PATENT DOCUMENTS

| JP | 50-106181 | 8/1975 |
|---|---|---|
| JP | 62-12004 A | 1/1987 |
| JP | 4-216843 A | 8/1992 |
| JP | 7-312120 A | 11/1995 |
| JP | 7-320555 A | 12/1995 |
| JP | 8-64039 A | 3/1996 |

* cited by examiner

*Primary Examiner* — William Mayo, III
(74) *Attorney, Agent, or Firm* — Foley & Lardner LLP

(57) ABSTRACT

A radiation-proof sheath material includes a polymer material containing molecular chains of ethylene units as a main component in which side chain groups are randomly distributed and cross-linked, an antioxidant, a processing aid, and a flame retardant. The polymer material includes chlorinated polyethylene containing chloro groups in the side chain groups.

5 Claims, 1 Drawing Sheet

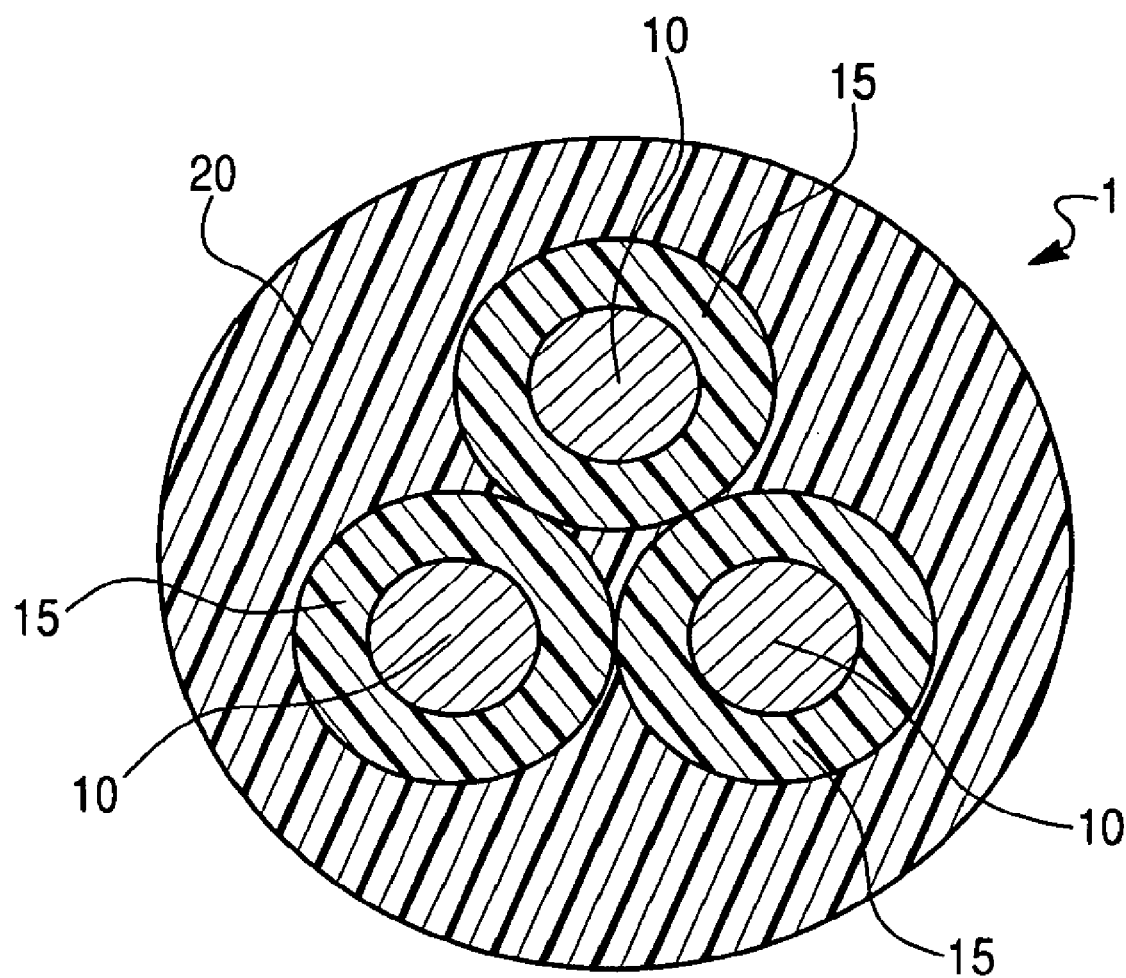

RADIATION-PROOF SHEATH MATERIAL AND RADIATION-PROOF CABLE

The present application is based on Japanese patent application No. 2008-119655 filed May 1, 2008, the entire contents of which are incorporated herein by reference.

BACKGROUND OF THE INVENTION

1. Field of the Invention

The present invention relates to a radiation-proof sheath material and a radiation-proof cable. In particular, it relates to a radiation-proof sheath material and a radiation-proof cable, which are excellent in flame retardancy and radiation resistance and which are used in nuclear power stations.

2. Description of the Related Art

Electric wires and cables used in nuclear power stations, such as boiling water reactors (BWRs), or pressurized water reactors (PWRs), are exposed to heat and radiations during normal running of each nuclear reactor operated in specified running conditions, and also in the event of loss-of-coolant accidents, flames, etc. Accordingly, in case of these accidents, electric wires and cables used in nuclear power stations are required to have high flame retardancy and radiation resistance.

Used as conventional electric wire and cable sheath materials are polychloreprene rubber (CR), chlorosulfonated polyethylene (CSM), etc. Also known as a sheath material is chlorinated polyethylene (refer to JP-A-8-64039, for example). Further known is a composition in which 3-50 parts by wt of lead silicate obtained by melting, cooling and milling a mixture of lead oxide and silicon dioxide is combined with 100 parts by wt of chlorinated polyethylene as a stabilizer, in which the chlorine content is 15% by wt to 30% by wt, and in which the remaining crystal by differential scanning calorimetry is 5 cal/g to 15 cal/g (refer to JP-A-4-216843, for example).

The CR sheath materials axe used mainly for BWRs (heat resistance required: 121° C.×7 days, radiation resistance required: 760 kGy), while the CSM sheath materials are used mainly for PWRs (heat resistance required: 140° C.×9 days, radiation resistance required: 2 MGy). Also, the sheath material disclosed by JP-A-8-64039 can be used as weld cables, conductive cables, and conductive cords, which require thermal and mechanical properties. Further, the composition using chlorinated polyethylene disclosed by JP-A-4-216843 can be used in wiring materials for electrical apparatuses, electronic apparatuses of each kind, etc., which require flame retardancy.

Also, because as an evaluation method for cable covering materials, it is difficult to simultaneously apply heat and radiations to the cable covering materials because of requiring a special apparatus, the evaluation method uses sequential ageing (irradiation after thermal ageing), Also, there is considered reversed sequential ageing (thermal ageing after irradiation).

Refer to JP-A-8-64039 and JP-A-4-216843, for example.

However, the CR sheath materials are poorer in heat resistance than the CSM sheath materials, and therefore cannot be used for PWRs. Also, the present inventors have found that the reversed sequential ageing evaluation results of heat resistance and radiation resistance of the CR and CSM sheath materials show poorer properties compared to the sequential ageing evaluation thereof. Further, the chlorinated polyethylene disclosed by JP-A-8-64039 and JP-A-4-216843 cannot be used for BWRs or PWRs because of being not at all suitable for use requiring radiation resistance.

SUMMARY OF THE INVENTION

Accordingly, it is an object of the present invention to provide a radiation-proof sheath material, which can be used as BWR and PWR sheath materials, and which can be tested with the reversed sequential method, and to provide a radiation-proof cable.

(1) According to one embodiment of the invention, a radiation-proof sheath material comprises:

a polymer material containing molecular chains of ethylene units as a main component in which side chain groups are randomly distributed and cross-linked; an antioxidant;

a processing aid; and a flame retardant,

In the embodiment (1), the following modifications and changes can be made.

(i) The polymer material comprises chlorinated polyethylene containing chloro groups in the side chain groups.

(ii) The antioxidant comprises 1 or more parts by wt to 100 parts by wt of the chlorinated polyethylene, the processing aid comprises from 10 parts by wt to 50 parts by wt, to 100 parts by wt of the chlorinated polyethylene, and the flame retardant comprises from 2 parts by wt to 30 parts by wt, to 100 parts by wt of the chlorinated polyethylene.

(iii) The antioxidant comprises an amine-based antioxidant and a sulfur-based antioxidant.

(iv) The processing aid comprises a petroleum-based oil, or an aromatic ring-containing plasticizer.

(v) The processing aid comprises the petroleum-based oil, and the petroleum-based oil comprises an aromatic-based oil.

(2) According to another embodiment of the invention, a radiation-proof cable comprises:

a radiation-proof sheath material comprising a polymer material containing molecular chains of ethylene units as a main component in which side chain groups are randomly distributed and cross-linked, an antioxidant added in the polymer material, a processing aid, and a flame retardant; and a conductor covered with an insulation material, or a stranded insulated electric wire (core) comprising plural stranded conductors, each covered with the insulation material, the conductor or the stranded insulated electric wire (core) provided with the radiation-proof sheath material therearound.

In the embodiment (2), the following modifications and changes can be made.

(vi) The polymer material comprises chlorinated polyethylene containing chloro groups in the side chain groups.

(vii) The antioxidant comprises 1 or more parts by wt to 100 parts by wt of the chlorinated polyethylene, the processing aid comprises from 10 parts by wt to 50 parts by wt, to 100 parts by wt of the chlorinated polyethylene, and the flame retardant comprises from 2 parts by wt to 30 parts by wt, to 100 parts by wt of the chlorinated polyethylene.

(viii) The antioxidant comprises an amine-based antioxidant and a sulfur-based antioxidant.

(ix) The processing aid comprises a petroleum-based oil, or an aromatic ring-containing plasticizer.

(x) The processing aid comprises the petroleum-based oil, and the petroleum-based oil comprises an aromatic-based oil.

(xi) The oxygen index of the radiation-proof sheath material is greater than the oxygen index of the insulation material.

ADVANTAGES OF THE INVENTION

According to the invention, it is possible to provide a radiation-proof sheath material, which can be used as BWR and PWR sheath materials, and which can be tested with the reversed sequential method, and to provide a radiation-proof cable.

BRIEF DESCRIPTION OF THE DRAWINGS

The preferred embodiments according to the invention will be explained below referring to the drawings, wherein:

FIG. 1 is a cross-sectional view showing a radiation-proof cable in a second embodiment.

DETAILED DESCRIPTION OF THE PREFERRED EMBODIMENTS

First Embodiment

A radiation-proof sheath material in the first embodiment of the invention comprises a polymer material containing molecular chains of ethylene units as main chains in which side chains are randomly bonded and cross-linked to the basic skeleton, an antioxidant added in the polymer material, a processing aid, and a flame retardant. Specifically, the radiation-proof sheath material used under a radiation environment in the first embodiment is formed by adding to a polymer material, i.e., chlorinated polyethylene, a specified amount of antioxidant, a specified amount of processing aid, and a specified amount of flame retardant. Also, the radiation-proof sheath material in the first embodiment can be formed by further adding a specified combination preparation.

Chlorinated Polyethylene

The chlorinated polyethylene in the first embodiment is formed as follows. First, linear polyethylene powder is prepared. The linear polyethylene contains low-density polyethylene (e.g., on the order of 910 kg/m$^3$ to 930 kg/m$^3$) to high-density polyethylene (e.g., on the order of 930 kg/m$^3$ to 970 kg/m$^3$). Subsequently, the linear polyethylene powder is suspended and dispersed in water into an aqueous suspension. Subsequently, at a temperature around a melting point of the polyethylene crystal as raw material, chlorine gas is blown into this aqueous suspension. This results in the chlorinated polyethylene in the first embodiment.

Because of the heterogeneous chemical reaction of chlorine gas and polyethylene by blowing the chlorine gas into the aqueous suspension, the resultant chlorinated polyethylene is formed as a thermoplastic elastomer containing amorphous rubber-like chlorinated polyethylene, and semicrystalline and crystalline plastic chlorinated polyethylene. The chlorinating degree in the chlorinated polyethylene used in the first embodiment can be 25% to 45%. Here, in the case of using rubber elastic chlorinated polyethylene, it is preferable that the chlorinating degree in the chlorinated polyethylene to be used is 30% to 40%.

Compared with CR and CSM as other chlorine-based polymers, the chlorinated polyethylene has no double bond in its molecular chains, and is random in distributions of chlorine atoms in the molecular chains, i.e., chloro groups as side chain groups, and thermally stable, excellent in weather resistance, and high in flame retardancy, because of high molecular weight.

Here, the present inventors have found the reason for the reversed sequential ageing evaluation of CR and CSM sheath materials showing remarkably poorer properties than the sequential ageing evaluation thereof. That is, the reversed sequential ageing evaluation of CR and CSM sheath materials performs thermal aging after radiation (γ-ray) application to the sheath materials. Consequently, radicals produced in the sheath materials by radiation application actively migrate due to heat applied to the sheath materials in subsequent thermal aging, to accelerate dehydrochlorination due to the radicals.

The CR and CSM have relatively regular molecular structure, and are also regular in chlorine atom (chloro group) distributions in the molecular chains, and therefore subject to radical dehydrochlorination. Accordingly, it is found that the reversed sequential ageing evaluation of CR and CSM sheath materials shows remarkably poorer properties than the sequential ageing evaluation thereof.

On the other hand, the radiation-proof sheath material in the first embodiment uses chlorinated polyethylene. This is because the present inventors have found that the chlorinated polyethylene is effective in the reversed sequential ageing mechanism, and very excellent in radiation resistance.

Namely, the chlorinated polyethylene is random in chloro group distributions in its molecular chains. The present inventors have found that the random chloro group distributions inhibit radicals produced by radiation application to the chlorinated polyethylene sheath material from migrating in the sheath material. This allows the present inventors to find that by employing chlorinated polyethylene as the radiation-proof sheath material, the sheath material can be formed that is tested with the reversed sequential method, and which is very excellent in radiation resistance. The present inventors have verified that below-described combination preparations of each kind permit further enhancement in radiation resistance.

Antioxidants

The antioxidant in the first embodiment provides the radiation-proof sheath material with heat resistance and radiation resistance. The antioxidant can use a phenol- or amine-based primary antioxidant. Also, the antioxidant can use a sulfur- or phosphorus-based secondary antioxidant. Specifically, the antioxidant in the first embodiment uses both the primary and secondary antioxidants. More specifically, for enhancement of heat resistance and radiation resistance, the antioxidant in the first embodiment uses both the amine-based primary antioxidant and sulfur-based secondary antioxidant.

The antioxidant comprises 1 or more parts by wt of total of primary and secondary antioxidants to 100 parts by wt of chlorinated polyethylene. For proper cross linking reaction of chlorinated polyethylene and reduction of cost in the radiation-proof sheath material manufacturing process, it is preferable that the total of primary and secondary antioxidants is set at the range from 1 part by wt to 15 parts by wt, to 100 parts by wt of chlorinated polyethylene.

The phenol-based primary antioxidant is classified into mono-, bis-, and poly-phenol-based primary antioxidants. The mono-phenol-based primary antioxidant can use 2,2'-di-t-butyl-4-methylphenol, 2,6-di-t-butyl-4-ethylphenol, or mono (α-methylbenzyl), for example. Also, the bis-phenol-based primary antioxidant can use 2,2'-methylene-bis(4-methyl-6-t-butylphenol), 2,2'-methylene-bis(4-ethyl-6-t-butylphenol), 4,4'-butyliden-bis(3-methyl-6-t-butylphenol), 4,4'-thiobis(3-methyl-6-t-butylphenol), butylated reaction product of p-cresol and dicyclopentadiene, or di(α-methylbenzyl), for example. Further, the poly-phenol-based primary antioxidant can use 2,5'-di-t-butylhydroquinone, 2,5'-di-t-amylhydroquinone, tri(α-methylbenzyl), for example.

The amine-based antioxidant can use a quinoline-based antioxidant, and an aromatic secondary amine-based antioxidant. The quinoline-based antioxidant can use 2,2,4-trimethyl-1,2-dihydroquinoline, or 6-ethoxy-1,2-dihydro-2,2,4-trimethylquinoline, for example. The aromatic secondary amine-based antioxidant can use phenyl-1-naphthylamine, alkylated diphenylamine, octylated diphenylamine, 4,4'-bis (α,α-dimethylbenzyl)diphenylamine, p-(p-toluenesulfonylamido)diphenylamine, N,N'-diphenyl-p-phenylenediamine, N-phenyl-N'-(1,3-dimethylbutyl)-p-phenylenediamine, or N-phenyl-N'-(3-methacryloyloxy-2-hydroxypropyl)-p-phenylenediamine, for example.

The sulfur-based secondary antioxidant is classified into benzimidazole-, dithiocarbamate-, thiourea-, and organic thio acid-based secondary antioxidants. The benzimidazole-based secondary antioxidant can use 2-mercaptobenzimidazole, 2-mercaptomethylbenzimidazole, or 2-mercaptobenzimidazole zinc salt, for example. Also, the dithiocarbamate-based secondary antioxidant can use nickel diethyldithiocarbamate, or nickel dibutyldithiocarbamate, for example. Further, the thiourea-based secondary antioxidant can use 1,3-bis(dimethylaminopropyl)-2-thiourea, or tributylthiourea, for example. Further, the organic thio acid-based secondary antioxidant can use dilauryl thiodipropionate, for example.

The phosphorus-based secondary antioxidant can use tris(nonylphenyl)phosphite, for example, as a phosphite-based secondary antioxidant.

The antioxidant in the first embodiment can also use a mixture of plural antioxidants selected from amine-, phenol-, sulfur-, and/or phosphorus-based secondary antioxidants.

Processing Aids

The processing aid in the first embodiment provides the radiation-proof sheath material with a processing stabilizer during radiation-proof sheath material blending or extrusion, and an anti-radiation (antirad) agent having radiation resistance. The processing aid can use petroleum-based oil (i.e., process oil), or aromatic ring (benzene ring)-containing ester-based plasticizer, for example.

The process oil can use paraffin-, aromatic-, or naphthene-based oil added to rubber materials, for example. The ester-based plasticizer can use a plasticizer having in its molecule dioctyl phthalate (DOP), diisononyl phthalate (DINP), diisodecyl phthalate (DIDP), or trioctyl trimellitate (TOTM) aromatic rings added to polyvinyl chloride, etc., for example.

Here, compounds containing numerous benzene ring compounds are excellent in radiation resistance, and are therefore preferably used as the processing aid in the first embodiment. For example, aromatic-based oil can be used as the processing aid. The processing aid can use any one of the process oil or ester-based plasticizer alone, or a mixture of plural compounds selected from the process oil and/or ester-based plasticizer.

To ensure workability and provide the radiation-proof sheath material with the antirad effect, the processing aid amount added is not less than 10 parts by wt to 100 parts by wt of chlorinated polyethylene. Also, the processing aid amount added exceeding 50 parts by wt to 100 parts by wt of chlorinated polyethylene tends to cause bleed, deterioration of mechanical properties, and saturation of the antirad effect. Thus, the processing aid is added to the radiation-proof sheath material in the range from 10 parts by wt to 50 parts by wt, to 100 parts by wt of chlorinated polyethylene.

Flame Retardants

The flame retardant can use inorganic or organic flame retardant The inorganic flame retardant can use antimony trioxide, magnesium hydroxide, aluminum hydroxide, zinc borate, or phosphorus-based compounds. Also, the organic flame retardant can use halogen-based organic flame retardants, such, as chlorine-, bromine-based organic flame retardants.

For example, the chlorine-based flame retardant can use chlorinated paraffin, or perchlorocyclopentadecan (trademark: Dechloran Plus). On the other hand, the bromine-based flame retardant can use pentabromoethylbenzene, hexabromobenzene, tetrabromophthalic anhydride, ethylene-bis(tetrabromophthalimide), ethylene-(5,6-dibromonorbornene-2, 3-dicarboxyimide), dibromoethyldibromocyclohexane, ethylene-bis(pentabromobenzene), etc., for example.

The flame retardant can use any one of the inorganic or organic flame retardant alone, or a mixture of plural flame retardants selected from the inorganic and/or organic flame retardant. The flame retardant is added to the radiation-proof sheath material in a range of exhibiting the flame retardant effect, no saturation of the flame retardant effect, and no deterioration of mechanical properties. Specifically, the flame retardant is added to the radiation-proof sheath material in the range from 2 parts by wt to 30 parts by wt, to 100 parts by wt of chlorinated polyethylene.

Also, the specified combination preparations, which can further be added to the radiation-proof sheath material, are a cross-linking aid and a stabilizer. Below are explained details thereof.

Cross-Linking Aids

The chlorinated polyethylene cross-linking method can use thioureas, amines, or peroxide cross-linking. Here, in the first embodiment, the peroxide cross-linking, such as di-cumyl peroxide (DCP) cross-linking, is preferable from the point of view of preservation, tensile strength, and heat resistance. In the peroxide cross-linking reaction, a cross-linking aid is preferably used therewith that serves to inhibit polymer radical breaking during cross-linking reaction to enhance cross-linking efficiency.

The cross-linking aid can use a polyfunctional monomer such as triallyl cyanurate (TAC), triallyl isocyanurate (TAIC), or trimethylolpropane triacrylate (TMPT), etc.

Stabilizers

The stabilizer inhibits decomposition reactions due to heat history during sheath material molding, and inhibits thermal ageing and radiation ageing in using the radiation-proof sheath material. The stabilizer can use a metal soap, lead-based compound, organic tin-based compound, hydrotalcite-based compound, or a composite stabilizer as a non-lead stabilizer containing a hydrotalcite-based compound and metal soap. As environment-friendly stabilizers, it is preferable to use a metal soap, organic tin-based compound, hydrotalcite-based compound, or a composite stabilizer as a non-lead stabilizer containing a hydrotalcite-based compound and metal soap.

The metal soap can use lithium stearate, magnesium stearate, magnesium 12-hydroxystearate, aluminum stearate, calcium stearate, calcium 12-hydroxystearate, barium stearate, barium 12-hydroxystearate, zinc stearate, zinc 12-hydroxystearate, calcium laurate, barium laurate, or zinc laurate.

The lead-based compound can use tribasic lead sulfate, tribasic lead sulfite, basic lead sulfite, dibasic lead phosphite, lead stearate, dibasic lead stearate, dibasic lead phthalate, or dibasic lead maleate. The organic tin-based compound can use dibutyl tin laurate, dibutyl tin dilaurate, dibutyl tin maleate, dibutyl tin dimaleate, dioctyl tin laurate, dioctyl tin dilaurate, dioctyl tin maleate, or dioctyl tin dimaleate.

The hydrotalcite-based compound can use a natural hydrotalcite containing metal ions such as magnesium ions, aluminum ions, etc., or synthetic hydrotalcite synthesized by coprecipitation caused by mixing a solution containing divalent and trivalent metal salts and an alkaline solution. Further, it is possible to use a hydrotalcite synthesized by adding metal ions such as zinc ions.

Other Combination Preparations

As further combination preparations, it is possible to use a lubricant, filler, colorant, etc., for example, used in rubber material synthesis. Normal methods can be employed in the chlorinated polyethylene cross-linking, physical mixing of the specified combination preparations in the chlorinated polyethylene, and sheath material extrusion for specified shape formation.

Advantages of the First Embodiment

Forming the sheath material from a polymer with a basic skeleton of chlorinated polyethylene allows the radiation-proof sheath material in the first embodiment of the invention to be used as BWR and PWR cable sheath materials, and tested with the reversed sequential method. Further, it is possible to provide the sheath material which has properties equal to or more than CR sheath material, and which is more inexpensive than CSM sheath material.

Second Embodiment

FIG. 1 is a schematic cross-sectional view showing a radiation-proof cable in the second embodiment according to the invention.

The radiation-proof cable 1 in the second embodiment comprises conductor 10 formed from conductive material such as copper or a copper alloy, insulator 15 for covering the conductor 10 as insulating material, and a sheath 20 for covering the conductor 10 from outside of the insulator 15. The radiation-proof cable 1 is provided with one or plural conductors 10. In the case of the radiation-proof cable 1 having plural conductors 10, the plural conductors 10 are stranded to constitute a stranded insulated electric wire (core), and the sheath 20 is formed (covered) around the perimeter of this stranded insulated electric wire (core).

The base polymer forming the insulator 15 can use polyethylene, cross-linked polyethylene, ethylene-vinyl acetate copolymer, ethylene-methyl acrylate copolymer, ethylene-ethyl acrylate copolymer, natural rubber, ethylene propylene rubber, butyl rubber, chlorosulfonated polyethylene, or chlorinated polyethylene. Also, the insulator 15 may be formed from a polymer blend comprising 2 or more kinds of polymers or more selected from these polymers.

A method for manufacturing radiation-proof cable 1 in the second embodiment is as follows. Namely, first, there are prepared plural conductors 10 (insulated electric wires) covered with insulator 15. Subsequently, the plural insulated electric wires prepared are stranded to constitute a stranded insulated electric wire (core), Subsequently, a compound for radiation-proof sheath material is extruded and covered around the stranded insulated electric wire (core). Subsequently, the compound covering the stranded insulated electric wire (core) is cross-linked (in specified-temperature high-pressure steam), thereby forming the compound into sheath 20 as sheath material. This results in radiation-proof cable 1 in the second embodiment. In the case of using only one insulated electric wire, a compound for radiation-proof sheath material is extruded and covered around the one insulated electric wire, followed by the same subsequent steps as in radiation-proof cable 1 in the second embodiment, thereby resulting in one radiation-proof insulated electric wire (covered conductor).

Examples

Table 1 shows combination of compounds forming sheath materials in Examples of the present invention, and in Comparative Examples.

TABLE 1

| Combination | Example | | | | | | Comparative Example | | | | | | |
|---|---|---|---|---|---|---|---|---|---|---|---|---|---|
| | 1 | 2 | 3 | 4 | 5 | 6 | 1 | 2 | 3 | 4 | 5 | 6 | 7 |
| Chlorinated polyethylene | 100 | 100 | 100 | 100 | 100 | 100 | — | — | 100 | 100 | 100 | 100 | 100 |
| Polychloroprene | — | — | — | — | — | — | 100 | — | — | — | — | — | — |
| Chlorosulfonated polyethylene | — | — | — | — | — | — | — | 100 | — | — | — | — | — |
| DCP | 3 | 3 | 3 | 3 | 3 | 3 | — | — | 3 | 3 | 3 | 3 | 3 |
| TAIC | 1.5 | 1.5 | 1.5 | 1.5 | 1.5 | 1.5 | — | — | 1.5 | 1.5 | 1.5 | 1.5 | 1.5 |
| Red lead (Pb$_3$O$_4$) | — | — | — | — | — | — | 30 | 30 | — | — | — | — | — |
| Sulfur | — | — | — | — | — | — | 0.5 | — | — | — | — | — | — |
| Accelerant TS | — | — | — | — | — | — | 1 | — | — | — | — | — | — |
| Accelerant TRA | — | — | — | — | — | — | — | 1 | — | — | — | — | — |
| Accelerant DM | — | — | — | — | — | — | — | 2 | — | — | — | — | — |
| Aromatic based oil | 40 | 30 | 50 | 40 | 40 | 15 | — | 40 | — | 5 | 70 | 40 | — |
| Amine based antioxidant | 1 | 1 | 1 | 1 | 1 | 1 | 1 | — | 1 | 0.5 | 1 | 1 | 1 |
| Sulfur based antioxidant | 2 | 5 | 5 | 5 | 5 | 5 | 5 | — | 5 | 0.5 | 5 | 5 | 5 |
| Tribasic lead sulfate | — | 5 | — | — | — | — | — | — | — | 5 | — | — | — |
| Stearic acid | — | 1 | — | — | — | — | — | — | 1 | — | — | — | — |
| Antimony trioxide | — | 8 | — | 25 | 2 | 8 | — | — | 8 | — | — | — | 50 |
| Calcium carbonate | — | 60 | — | — | — | — | — | — | 60 | — | — | — | — |
| FT carbon | — | 20 | — | — | — | — | — | — | 20 | — | — | — | — |
| Total | 241.5 | 234.5 | 254.5 | 261.5 | 238.5 | 219.5 | 266.5 | 268 | 238.5 | 209.5 | 269.5 | 236.5 | 286.5 |

Examples 1 to 6 and Comparative Examples 3 to 7 use chlorinated polyethylene as polymer material. The chlorinated polyethylene used is Tyrin® CM566 (made by Dow Chemical Company, chlorinating degree: 36%). On the other hand, Comparative Example 1 uses polychloroprene (Shoprene W®, made by SHOWA DENKO K.K.) as polymer material, and Comparative Example 2 uses chlorosulfonated polyethylene (Hypalon 40®, made by DuPont Performance Elastomers) as polymer material.

Also used as cross-linking aids are DCP and TAIC. Also, Comparative Example 1 uses tetramethylthiuram monosulfide (accelerator TS) as a vulcanization accelerator, and Comparative Example 2 uses dipentamethylenethiuram tetrasulfide (accelerator TRA) and dibenzothiazolyl disulfide (accelerator DM) as vulcanization accelerators.

Also, the aromatic-based oil used as processing aid is Diana process oil AH-16 (made by Idemitsu Kosan Co., Ltd.).

Further, used as antioxidants are Vulkanox® DDA (manufactured by Bayer), which is an amine-based antioxidant, and NOCRAC NBC (manufactured by Ouchi Shinko Chemical Industrial Co., Ltd.), which is a sulfur-based antioxidant. Also used as one of flame retardants is calcium carbonate (Softon 1200® manufactured by Bihokufunka Industrial Co., Ltd.).

Table 2 shows combination ratios of compounds constituting insulators covering conductors in Examples of the present invention and Comparative Examples.

TABLE 2

| Combination preparations | Combination ratio (wt %) |
| --- | --- |
| EPDM | 100 |
| DCP | 3 |
| Chinese white No. 3 (ZnO) | 5 |
| Amine-based antioxidant | 2 |
| Stearic acid | 1 |
| Aromatic-based oil | 5 |
| Talc | 50 |
| Bromine-based flame retardant | 20 |
| Antimony trioxide | 10 |
| FEF carbon black | 2 |
| Total | 198 |

Used as polymer insulating material for forming insulator 15 is ethylene-propylene-dienerubber (EPDM, EPT3045, manufactured by Mitsui Chemicals). Used as amine-based antioxidant is Vulkanox® DDA (manufactured by Bayer). Also, the aromatic-based oil used as processing aid is Diana process oil AH-16 (made by Idemitsu Kosan Co., Ltd.). Further, used as talc is HI-FILLER#16 (manufactured by Tsuchiya Carolin), and used as bromine-based flame retardant is SAYTEX 8010 (manufactured by Albemarle Asano).

Manufacturing Radiation-Proof Sheath Material and Radiation-Proof Cable

Compounds for radiation-proof sheath materials in Examples and Comparative Examples are manufactured as follows.

First, each compound shown in Table 1 is weighed for each of Examples and Comparative Examples. Then, for each of Examples and Comparative Examples, each compound except for DCP as cross-linking aids is mixed using a Banbury mixer resulting in pellet-shaped compounds (e.g., compounds in Examples 1, 2, etc.). Subsequently, in the blender held at approximately 60° C., the pellet-shaped compounds obtained are impregnated with DCP (except for Comparative Examples 1 and 2). This results in compounds for radiation-proof sheath materials in Examples and Comparative Examples (e.g., compounds for radiation-proof sheath materials in Examples 1, 2, etc.).

Also prepared is a flame retardant EP rubber insulated wire. The flame retardant EP rubber insulated wire is manufactured by extruding and covering around 3.5 mm²-cross-section conductor an insulating material obtained by combination at the combination ratios shown in Table 2, and then cross-linking the insulating material in approximately 190° C. high-pressure steam. The oxygen index of insulator 15 of the flame retardant EP rubber insulated wire is 26.0. In all of Examples and Comparative Examples, the flame retardant EP rubber insulated wire used is the same.

3 flame retardant EP rubber insulated wires are stranded resulting in a stranded insulated electric wire (core). Subsequently, using a 90 mm extruder, the manufactured compounds for radiation-proof sheath material are extruded and covered around the stranded insulated electric wire (core). Specifically, for each of Examples and Comparative Examples, the compounds are covered around the surface of the stranded insulated electric wire (core). (e.g., The compound for radiation-proof sheath material in Example 1 is covered around the surface of the stranded insulated electric wire (core).)

Subsequently, approximately 190° C. pressurized steam is applied to the surface of the stranded insulated electric wire (core) covered with the compounds for radiation-proof sheath material, to thereby cross-link the compounds. This results in a sheath formed of radiation-proof sheath material around the stranded insulated electric wire (core), and a 17.5 mm-diameter radiation-proof cable for each of Examples and Comparative Examples.

Testing Radiation-Proof Cable Properties

Next, the radiation-proof cables obtained are tested and evaluated for each item shown below.

Test (A) Appearance: Bloom (precipitation of combination preparation in powder form on sheath surface) and bleed (leak of combination preparation in liquid form on sheath surface) are inspected visually.

Test (B) Sheath material tensile test: Sheath material is separated from radiation-proof cables, followed by thickness adjustment to approximately 2 mm, and press-cutting into dumbbell No. 4 shape, and measurement at the speed of 500 mm/min with Schopper tensile tester.

Test (C) Oxygen index: Oxygen index is measured by using the compounds in the same lot of the sheath (e.g., in Example 1, the compound for radiation-proof sheath material that is the radiation-proof cable sheath raw material in Example 1), and fabricating 3 mm t sheets by 180° C.×10 min press-cross-linking.

Test (D) New VTFT test: Tested in accordance with IEEE Std. 383-2003 (IEEE Std. 1202-1991).

Test (E-1) Radiation resistance (1) (reversed sequential test (1)): The radiation-proof cables are bundled into approximately 600 mmϕ, and irradiated with 760 kGy $^{60}$Co γ rays at 4 kGy/h dose rate, followed by 121° C.×7 day thermal ageing testing, and subsequent tensile testing in the same way as in Test (B). Here, the case of the elongation being not less than 50% shows a Pass.

Test (E-2) Radiation resistance (2) (reversed sequential test (2)): The radiation-proof cables are bundled into approximately 600 mmϕ, and irradiated with 2 MGy $^{60}$Co γ rays at 4 kGy/h dose rate, followed by 140° C.×9 day thermal ageing testing, and subsequent tensile testing in the same way as in Test (B). Here, the case of the elongation being not less than 50% shows a Pass.

The elongation is calculated as follows.

Dumbbell specimen's middle portion (Width: 5 mm, Length: 20 mm or more) is provided with predetermined length marks spaced at a constant pitch L0 (e.g., L0=20 mm). This dumbbell specimen is tensioned with the tensile tester, to break the dumbbell specimen. If the distance between marks when the dumbbell specimen is broken is L1, then elongation E0 is calculated using E0={(L1−L0)/L0}×100 (Formula 1).

Table 3 shows results of the property testing of the radiation-proof cables in Examples of the invention and Comparative Examples.

TABLE 3

| Item | | Example 1 | 2 | 3 | 4 | 5 | 6 |
|---|---|---|---|---|---|---|---|
| Appearance (bloom, bleed) | | None | None | None | None | None | None |
| Tensile test | Tensile strength (MPa) | 13.3 | 13.5 | 12.8 | 13.1 | 13.2 | 13.5 |
| | Elongation (%) | 560 | 510 | 590 | 540 | 530 | 490 |
| | 200% modulus | 5.3 | 5.6 | 5.1 | 5.4 | 5.1 | 5.8 |
| Oxygen index | | 34.0 | 35.5 | 33.0 | 37.5 | 32.0 | 37.5 |
| New VTFT | | Pass | Pass | Pass | Pass | Pass | Pass |
| Radiation resistance (1) (760 kGy) | Tensile strength (MPa) | 10.5 | 10.2 | 11.3 | 10.9 | 10.8 | 10.9 |
| | Elongation (%) | 170 | 160 | 180 | 175 | 175 | 175 |
| Radiation resistance (2) (2 MGy) | Tensile strength (MPa) | 8.7 | 8.8 | 9.4 | 9.1 | 8.9 | 9.1 |
| | Elongation (%) | 70 | 60 | 80 | 75 | 70 | 60 |
| Overall evaluation | | Pass | Pass | Pass | Pass | Pass | Pass |

| Item | | Comparative Example 1 | 2 | 3 | 4 | 5 | 6 | 7 |
|---|---|---|---|---|---|---|---|---|
| Apperance (bloom, bleed) | | None | None | None | None | With bleed | None | With bloom |
| Tensile test | Tensile strength (MPa) | 15.2 | 14.0 | 13.6 | 15.1 | 12.9 | 13.8 | 10.7 |
| | Elongation (%) | 540 | 570 | 540 | 380 | 690 | 520 | 480 |
| | 200% modulus | 5.7 | 5.6 | 5.7 | 6.3 | 4.8 | 5.3 | 6.1 |
| Oxygen index | | 38.0 | 35.5 | 34.5 | 37.0 | 30.5 | 31.0 | 40.0 |
| New VTFT | | Pass | Pass | Pass | Pass | Fail | Fail | Pass |
| Radiation resistance (1) (760 kGy) | Tensile strength (MPa) | Fragile | — | — | — | — | — | — |
| | Elongation (%) | Fragile | — | — | — | — | — | — |
| Radiation resistance (2) (2 MGy) | Tensile strength (MPa) | — | 6.3 | 7.2 | 8.6 | 8.9 | 9.2 | 8.1 |
| | Elongation (%) | — | 20 | 30 | 10 | 80 | 60 | 40 |
| Overall evaluation | | Fail | Fail | Fail | Fail | Fail | Fail | Fail |

Radiation resistance (1): 121° C. × 7 day heat treatment after γ-ray application
Radiation resistance (2): 140° C. × 9 day heat treatment after γ-ray application Examples 1 to 6 according to the invention all satisfy all the properties. Namely, the radiation-proof cables in Examples 1 to 6 pass the overall evaluations. The oxygen index of the radiation-proof cable sheaths in Examples 1 to 6 according to the invention is greater than the oxygen index of the insulator as insulation material for covering the conductor. In other words, the radiation-proof cable sheaths in Examples 1 to 6 according to the invention all are more unlikely to be burned than the insulator covering the conductor.

On the other hand, Comparative Example 1 uses polychloroprene as polymer material, and Comparative Example 2 uses chlorosulfonated polyethylene as polymer material. The radiation-proof cables in Comparative Examples 1 and 2 both do not satisfy elongation after radiation resistance tests (Test (E-1) and Test (E-2)).

The radiation-proof cables using the sheaths in Comparative Example 3 with no antioxidant, and Comparative Example 4 added with less than a prescribed value of aromatic-based oil, do not satisfy radiation resistance tests in Test (E-1) and Test (E-2). Also, Comparative Example 5 radiation-proof cable using a sheath added with a large amount of aromatic-based oil compared with Examples 1 to 6, and the other Comparative Examples, exhibits bleed in its initial sample. Also, Comparative Example 5 added with a large amount of aromatic-based oil, and Comparative Example 6 added with no antimony trioxide, fail the new VTFT test.

Further, it is observed that Comparative Example 7 using a sheath added with a large amount of flame retardant compared with Examples 1 to 6, and the other Comparative Examples, exhibits a large amount of bloom after radiation resistance tests. As a result of analyzing powder precipitated on its sheath surface due to this bloom, it is found that it is a compound considered to be an intermediate formed by reaction of the flame retardant and halogen (chlorine).

As seen from the foregoing, it is shown that the radiation-proof cables in Examples 1 to 6 of the invention can be used as BWR cables with 121° C.×7 day heat resistance and 760 kGy radiation resistance required, and as PWR cables with 140° C.×9 day heat resistance and 2 MGy radiation resistance required. Further, it is shown that the radiation-proof cables in Examples 1 to 6 of the invention can be tested with the reversed sequential method. In other words, it is shown that the radiation-proof cables in Examples 1 to 6 of the invention can inhibit ageing of the compositions even after being exposed to a large amount of radiation.

Although the invention has been described with respect to the above embodiments, the above embodiments are not intended to limit the appended claims. Also, it should be noted that not all the combinations of the features described in the above embodiments are essential to the means for solving the problems of the invention.

What is claimed is:

1. A radiation-proof sheath material, comprising:
   a chlorinated polyethylene containing molecular chains of ethylene units as a main component in which side chain groups containing chloro groups therein are randomly distributed and cross-linked;
   an antioxidant comprising an amine-based antioxidant and a sulfur-based antioxidant, and comprising 1 or more parts by wt. to 100 parts by wt. of the chlorinated polyethylene;
   a processing aid comprising from 10 parts by wt. to 50 parts by wt., to 100 parts by wt. of the chlorinated polyethylene; and
   a flame retardant comprising from 2 parts by wt. to 30 parts by wt., to 100 parts by wt. of the chlorinated polyethylene.

2. The radiation-proof sheath material according to claim 1, wherein the processing aid comprises a petroleum-based oil, or an aromatic ring-containing plasticizer.

3. The radiation-proof sheath material according to claim 2, wherein the processing aid comprises the petroleum-based oil, and the petroleum-based oil comprises an aromatic-based oil.

4. A radiation-proof cable, comprising:
   a radiation-proof sheath material comprising a polymer material containing molecular chains of ethylene units as a main component in which side chain groups are randomly distributed and cross-linked, an antioxidant comprising an amine-based antioxidant and a sulfur-based antioxidant added in the polymer material, a processing aid, and a flame retardant; and
   a conductor covered with an insulation material, or a stranded insulated electric wire (core) comprising plural stranded conductors, each covered with the insulation material, the conductor or the stranded insulated electric wire (core) provided with the radiation-proof sheath material therearound.

5. The radiation-proof cable according to claim 4, wherein the oxygen index of the radiation-proof sheath material is greater than the oxygen index of the insulation material.

* * * * *